(12) United States Patent
Miller (10) Patent No.: US 9,409,131 B2
(45) Date of Patent: Aug. 9, 2016

(54) FUNCTIONAL AND REUSABLE ELECTRODEPOSITED COATINGS ON POROUS MEMBRANES

(75) Inventor: Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 1047 days.

(21) Appl. No.: 13/378,976

(22) PCT Filed: Jun. 13, 2011

(86) PCT No.: PCT/US2011/040148
§ 371 (c)(1),
(2), (4) Date: Dec. 16, 2011

(87) PCT Pub. No.: WO2012/173591
PCT Pub. Date: Dec. 20, 2012

(65) Prior Publication Data
US 2012/0312687 A1    Dec. 13, 2012

(51) Int. Cl.
*C25D 5/48* (2006.01)
*C25D 5/10* (2006.01)
(Continued)

(52) U.S. Cl.
CPC .......... *B01D 67/0088* (2013.01); *B01D 53/228* (2013.01); *B01D 63/10* (2013.01); *B01D 65/02* (2013.01); *B01D 67/0093* (2013.01); *B01D 71/022* (2013.01); *B82Y 30/00* (2013.01); *C09D 5/008* (2013.01); *C09D 5/4476* (2013.01);
(Continued)

(58) Field of Classification Search
CPC ........ C23C 18/1633–18/1648; C23C 18/1689; C25D 5/48
See application file for complete search history.

(56) References Cited

U.S. PATENT DOCUMENTS 5,538,642 A   7/1996 Solie
5,683,916 A   11/1997 Goffe et al.
(Continued)

FOREIGN PATENT DOCUMENTS

FR   WO 2009109727 A1 *  9/2009   .......... B81C 1/00206
JP   H06238141                 8/1994
(Continued)

OTHER PUBLICATIONS

Author Unknown, "Mustang® Membrane Devices for Ion Exchange Chromatography", Pall Corporation, http://www.pall.com/laboratory_7001.asp, Jan. 2010, 2 pages.
(Continued)

*Primary Examiner* — Nicholas A Smith
*Assistant Examiner* — Brian W Cohen
(74) *Attorney, Agent, or Firm* — Dorsey & Whitney LLP (57) ABSTRACT

Functionalized membranes for use in applications, such as electrodeionization, can be prepared simply and efficiently by coating a conductive carbon nanotube and polymer membrane with a metal layer; and contacting the coated membrane with a solution comprises at least one electrochemically active and functional compound under conditions suitable for electrochemically depositing the electrochemically active and function compound on a surface of the metal-coated membrane. Such membranes may be reversible modified by chemically or electrochemically oxidizing the metal layer from the polymer membrane surface, thereby, providing a fresh surface which may be re-modified according to the preceding methods.

24 Claims, 3 Drawing Sheets

(51) Int. Cl.

| | |
|---|---|
| *B01D 67/00* | (2006.01) |
| *B01D 53/22* | (2006.01) |
| *B01D 63/10* | (2006.01) |
| *B01D 65/02* | (2006.01) |
| *B01D 71/02* | (2006.01) |
| *B82Y 30/00* | (2011.01) |
| *C09D 5/44* | (2006.01) |
| *C25D 7/00* | (2006.01) |
| *C09D 5/00* | (2006.01) |
| *C09D 9/00* | (2006.01) |
| *B01D 61/14* | (2006.01) |
| *C23C 18/16* | (2006.01) |
| *C23C 22/02* | (2006.01) |

(52) U.S. Cl.
CPC .. *C09D9/00* (2013.01); *C25D 5/10* (2013.01); *C25D 5/48* (2013.01); *C25D 7/00* (2013.01); *B01D 61/145* (2013.01); *B01D 2313/345* (2013.01); *B01D 2321/168* (2013.01); *B01D 2325/26* (2013.01); *C23C 18/1648* (2013.01); *C23C 22/02* (2013.01)

(56) References Cited

U.S. PATENT DOCUMENTS

| | | | |
|---|---|---|---|
| 6,468,657 | B1 | 10/2002 | Hou et al. |
| 6,491,934 | B1 | 12/2002 | Bekele |
| 7,037,425 | B2 | 5/2006 | Lee et al. |
| 7,211,320 | B1 | 5/2007 | Cooper et |
| 7,229,556 | B1 | 6/2007 | Hinds, III et al. |
| 7,611,628 | B1 | 11/2009 | Hinds, III |
| 7,914,875 | B2 | 3/2011 | Jiang et al. |
| 2002/0027072 | A1 | 3/2002 | Cui et al. |
| 2003/0191302 | A1 | 10/2003 | Kolzau et al. |
| 2004/0126899 | A1 | 7/2004 | Lee et al. |
| 2005/0263456 | A1* | 12/2005 | Cooper et al. ............... 210/660 |
| 2006/0292680 | A1 | 12/2006 | Barbari et al. |
| 2008/0093224 | A1 | 4/2008 | Tour et al. |
| 2008/0160384 | A1 | 7/2008 | Iqbal et al. |
| 2008/0292887 | A1 | 11/2008 | Kim et al. |
| 2009/0001009 | A1* | 1/2009 | Linder et al. ............... 210/243 |
| 2009/0321355 | A1 | 12/2009 | Ratto et al. |
| 2010/0068461 | A1 | 3/2010 | Wallace et al. |
| 2010/0140097 | A1* | 6/2010 | Wei et al. ................ 205/50 |
| 2011/0168560 | A1* | 7/2011 | Afzali-Ardakani et al. .. 204/521 |
| 2011/0174629 | A1* | 7/2011 | Bouchet ........... G01N 33/48721 205/131 |
| 2012/0160694 | A1* | 6/2012 | Wolters et al. ............... 205/50 |
| 2012/0312691 | A1 | 12/2012 | Miller |
| 2012/0312737 | A1 | 12/2012 | Miller |
| 2013/0161602 | A1* | 6/2013 | James ........... H01L 51/0021 257/40 |

FOREIGN PATENT DOCUMENTS

| | | |
|---|---|---|
| JP | 2011502749 | 1/2011 |
| WO | WO 02/04918 | 1/2002 |
| WO | WO 02/060812 | 8/2002 |
| WO | WO 02/096979 | 12/2002 |
| WO | WO 2008/028155 | 3/2008 |
| WO | WO 2009-148959 | 12/2009 |

OTHER PUBLICATIONS

Bahr et al., "Functionalization of Carbon Nanotubes by Electrochemical Reduction of Aryl Diazonium Salts: A Bucky Paper Electrode", J. Am. Chem. Sci., 2001, 123(27), pp. 6536-6542.
Balasubramanian et al., "Chemically Functionalized Carbon Nanotubes", www.small-journal.com, 2005, 1(2), pp. 180-192.
Bruggen, "Chemical Modification of Polyethersulfone Nanofiltration Membranes: A Review", Journal of Applied Polymer Science, 2009, vol. 114, Issue 1, pp. 630-642.
Fischer-Frühholz, "Sartobind Membrane Adsorbers", Startorius Stedim Biotech, Aug. 4, 2009, 41 pages.
Hinds et al., "Aligned Multiwalled Carbon Nanotube Membranes", Science, Jan. 2, 2004, 303, 5 pages.
Huang et al., "Biotin-Derivatized Poly(L-lysine)-g-poly(ethylene glycol): A Novel Polymeric Interface for Bioaffinity Sensing", Langmuir, 2002, 18(1), pp. 220-230.
International Patent Application No. PCT/US2011/040145: International Search Report dated Jul. 26, 2011, 18 pages.
International Patent Application No. PCT/US2011/040149: International Search Report dated Aug. 2, 2011, 12 pages.
Ismail et al., "Transport and Separation Properties of Carbon Nanotube-Mixed Matrix Membrane", Separation and Purification Technology, 2009, 70, pp. 12-26.
Kato et al., Immobilization of DNA onto a Polymer Support and Its Potentiality as Immunoadsorbent, Biotechnology and Bioengineering, Sep. 1996, vol. 51, Issue 5, pp. 581-590.
Prakash et al., Surface Modification in Microsystems and Nanosystems:, Surface Science Reports, 2009, vol. 64, Issue 7, pp. 233-254.
Ulbricht, "Advanced Functional Polymer Membranes", Polymer, Mar. 2006, vol. 47, Issue 7, pp. 2217-2262 also -0033.
Vogt et al., "Are Carbon Nanotubes the Ultimate Water Transporters?", http://www.azonano.com/details.asp?Articled=2422, Oct. 2009, 3 pages.
Wu et al., "Programmable Transdermal Drug Delivery of Nicotine Using Carbon Nanotube Membranes", PNAS, www.pnas.org/cgi/doi/10.1073/pnas.1004714107, Jun. 29, 2010, 107(26), 5 pages.
Aoki, N., "Carbon Nanotubes as Scaffolds for Cell Culture and Effect on Cellular Functions," Dental Materials Journal, vol. 26, No. 2, pp. 178-185 (2007).
Astell, CV., and Smith, M., "Thermal Elution of Complementary Sequences of Nucleic Acids from Cellulose Columns with Covalently Attached Oligonucleotides of Known Length and Sequence," Journal of Biological Chemistry, vol. 246, pp. 1944-1946 (1971).
Gilham, P.T., "Complex Formation in Oligonucleotides and Its Application to the Separation of Polynucleotides," J. Am. Chem. Soc., vol. 84, No. 7, pp. 1311-1312 (1962).
Gilham, P.T., "The Synthesis of Polynucleotide-Celluloses and Their Use in the Fractionation of Polynucleotides," J. Am. Chem. Soc. vol. 86, No. 22, pp. 4982-4985 (1964).
Jovin, T.M., and Kornberg, A., "Polynucleotide Celluloses as Solid State Primers and Templates for Polymerases," Journal of Biological Chemistry, vol. 243, pp. 250-259 (1968).
Litman, R.M., "A Deoxyribonucleic Acid Polymerase from Micrococcus luteus (Micrococcus lysodeikticus) Isolated on Deoxyribonucleic Acid-Cellulose," Journal of Biological Chemistry, vol. 243, pp. 6222-6233 (1968).
Mangalam, A.P., et al., "Cellulose/DNA Hybrid Nanomaterials." Biomacromolecules, vol. 10, No. 3, pp. 497-504 (2009).
Moss, L.G., et al., "A simple, efficient method for coupling DNA to cellulose. Development of the method and application to mRNA purification," Journal of Biological Chemistry, vol. 256, pp. 12655-12658 (1981).
Naylor, R., and Gilham, P.T., "Studies on Some Interactions and Reactions of Oligonucleotides in Aqueous Solution," Biochemistry, vol. 5, No. 8, pp. 2722-2728 (1966).
Niemeyer, C.M., "The developments of semisynthetic DNA-protein conjugates," Trends in Biotechnology, vol. 20, Issue 9, pp. 395-401 (2002).
Pinson J., and Podvorica, F., "Attachment of organic layers to conductive or semiconductive surfaces by reduction of diazonium salts," Chemical Society Review, vol. 34, pp. 429-439 (2005).
Rakov, E.G., "Chemistry of Carbon Nanotubes," in Nanotubes and Nanofibers, Gogotsi, Y., eds., Taylor & Francis, pp. 37-108 (2006).
Waje, M.M., et al., "Deposition of platinum nanoparticles on organic functionalized carbon nanotubes grown in situ on carbon paper for fuel cells," Nanotechnology, vol. 16, No. 7, p. S395 (2005).
Yamada, M., et al., "UV-Irradiated DNA Matrix Selectively Accumulates Heavy Metal Ions," Bulletin of the Chemical Society of Japan, vol. 75, No. 7, pp. 1627-1632 (2002).

(56) References Cited

OTHER PUBLICATIONS

Yamada, M., et al., "UV-Irradiated DNA Matrixes Selectively Bind Endocrine Disruptors with a Planar Structure," Environmental Science Technology, vol. 36, No. 5, pp. 949-954 (2002).

Yamada, M., et al., "UV-irradiation-induced DNA immobilization and functional utilization of DNA on nonwoven cellulose fabric," Biomaterials, vol. 22, Issue 23, pp. 3121-31269 (2001).

Zhu, B-K., et al., "Preparation and properties of the polyimide/multi-walled carbon nanotubes (MWNTs) nanocomposites," Composite Science Technology, vol. 66, Issue 3-4, pp. 548-554 (2006).

Bradley, J -. et al., "Bipolar Electrodeposition of Polypyrrole onto Both Ends of a Carbon Nanotube", Chemico-biological Interactions, No. 3, 2003, 245-250.

Breuer,, O et al., "Big Returns From Small Fibers: A review of Polymer/Carbon Nanotube Composites", Polymer Composites, vol. 25, No. 6, Dec. 2004, 630-645.

Koizumi, et al., "Vertical Embedding of Carbon Nanotubes on Electrode Covered with Track Etch Membrane", Japanese Journal of Applied Physics, vol. 43, Part 1, No. 12, Dec. 9, 2014, 8374.

Liu, et al., "Preparation and characterization of carbon nanotube/polyetherimide nanocomposite films", Composites Science and Technology, vol. 67, Issues 3-4, DOI: 10.1016/j.compscitech.2006.09.007, Mar. 2007, 406-412.

Lu, et al., "Carbon Nanotube Supercapacitor", Carbon Nanotubes, ISBN: 978-953-307-054, InTech, Mar. 2010,.

Zhang, et al., "A sensitive DNA biosensor fabricated with gold nanoparticles/ploy (p-aminobenzoic acid)/carbon nanotubes modified electrode", Colloids and Surfaces B: Biointerfaces, vol. 75, issue 1, DOI: 10.1016/j.colsurfb.2009.08.030, Jan. 2010, 179-185.

Author Unknown, "Electrodeionization", http://en.wikipedia.org/wiki/Electrodeionization, Jan. 2010, 6 pages.

Balasubramanian et al., "Electrochemically functionalized carbon nanotubes for device applications Electrochemically Functionalised", Carbon, j mat chem, v18, pp. 3071-3083, 2008.

Chu et al., "Thermoresponsive transport through porous membranes with grafted PNIPAM gates", AIChE Journal, vol. 49 Issue 4, 2004 pp. 896-909.

Dey, "Performance of cross-flow spiral-wound EDI modules", http://www.watertechonline.com/article.asp?IndexID=6635678, Oct. 2005, 5 pages.

Fulghum et al., "Stimuli-Responsive Polymer Ultrathin Films with a Binary Architecture: Combined Layer-by-Layer Polyelectrolyte and Surface-Initiated Polymerization Approach", Macromolecules, 2008, 41 (2), pp. 429-435.

Hu et al., "Fabrication of thin-film electrochemical sensors from single-walled carbon nanotubes by vacuum filtration", Carbon, vol. 48, Issue 5, Apr. 2010, pp. 1345-1352.

International Patent Application No. PCT/US2011/040148: International Search Report dated Aug. 22, 2011, 12 pages.

Kou et al., "Electrochemical atomic layer deposition of a CuInSe2 thin film on flexible multi-walled carbon nanotubes/polyimide nanocomposite membrane: Structural and photoelectrical characterizations", Electrochimica Acta, vol. 56, Issue 16, Jun. 30, 2011, pp. 5575-5581.

Landers et al, "Prevention of influenza pneumonitis by sialic Acid-conjugated dendritic polymers", J Infect Dis. Nov. 1, 2002;186(9):1222-30.

Leiknes et al., "Removal of natural organic matter (NOM) in drinking water treatment by coagulation—microfiltration using metalmembranes", Journals of Membrane Science, vol. 242, Issues 1-2, Oct. 15, 2004, pp. 47-55.

Mucic et al., "DNA-Directed Synthesis of Binary Nanoparticle Network Materials", Department of Chemistry, Northwestern University, Evanston, Illinois 60208, J. Am. Chem. Soc., 1998, 120 (48), pp. 12674-12675.

New Logic Research, Inc., T"echnology Introduction", Jun. 2009, http://www.vsep.com/technology/index.html.

Song et al., "Multilayer structured amperometric immunosensor based on gold nanoparticles and Prussian blue nanoparticles/nanocomposite functionalized interface", Electrochimica Acta, vol. 55, Issue 5, Feb. 1, 2010, pp. 1778-1784.

Wildgoose et al., "Chemically Modified Carbon Nanotubes for Use in Electroanalysis", Microchim Acta 152, 187-214 (2006), published on-line Nov. 30, 2005.

Author Unknown, "Technology Introduction", New Logic Research, Inc., http://www.vsep.com/technology/index.html, Jun. 2009, 4 pages.

Bahshi et al., "Following the Biocatalytic Activities of Glucose Oxidase by Electrochemically Cross-Linked Enzyme-Pt Nanoparticles Composite Electrodes", Anal. Chem. 2008, vol. 80, No. 21, pp. 8253-8259 (Oct. 2008).

Lim et al., "A glucose biosensor based on electrodeposition of palladium nanoparticles and glucose oxidase onto Nafion-solubilized carbon nanotube electrode", Biosensors and Bioelectronics, vol. 20, Issue 11, (May 15, 2005) pp. 2341-2346.

Thesis, M.S., "Protein covalent modification on diamand and glassy carbon and electrochemical biosensing," Tongji University (Shanghai, China) pp. 1-6 (Mar. 2007) (English Abstract).

Wang, Rui-xiang "Method for Non-Corrosive Removal of Copper—Nickle—Chromium Coatings on Steel Substrate", Electoplating & Finishing, vol. 29 No. 4, 29-30, Apr. 30, 2010.

U.S. Appl. No. 13/383,955, May 26, 2015, Office Action.
U.S. Appl. No. 13/383,802, Aug. 29, 2013, Office Action.
U.S. Appl. No. 13/383,802, Nov. 8, 2013, Office Action.
U.S. Appl. No. 13/383,802, Apr. 25, 2014, Office Action.
U.S. Appl. No. 13/383,802, Jul. 7, 2014, Office Action.
U.S. Appl. No. 13/383,802, Oct. 8, 2014, Office Action.
U.S. Appl. No. 13/383,802, May 21, 2015, Office Action.
U.S. Appl. No. 13/383,802, Aug. 17, 2015, Office Action.
U.S. Appl. No. 13/383,955, Sep. 4, 2015, Office Action.

Mahouche-Chergui et al. "Aryl diazonium salts: a new class of coupling agents for bonding polymers, biomacromolecules and nanoparticles to surfaces" Chemical Society Reviews, 2011, 40, 4143-4166.

U.S. Appl. No. 13/383,955, Jan. 14, 2016, Office Action.
U.S. Appl. No. 13/383,802, Feb. 10, 2016, Office Action.

* cited by examiner

FUNCTIONAL AND REUSABLE ELECTRODEPOSITED COATINGS ON POROUS MEMBRANES

CROSS-REFERENCE TO RELATED APPLICATION

This application is the National Stage filing under 35 U.S.C. §371 of International Application No. PCT/US2011/040148, filed on Jun. 13, 2011, the disclosure of which is incorporated herein by reference in its entirety.

TECHNICAL FIELD

The disclosure relates to electrochemically modifiable membranes, methods for their preparation, modification, and recycling; and uses thereof, such as, for air and/or water purification.

BACKGROUND

Smart membranes today have a very limited range of performance. Membranes exist that can switch hydrophobicity based on pH or temperature signals, and conducting polymer membranes that can swell and shrink as they are charged and discharged, to modulate pore size. For example, smart membranes have largely consisted of membranes containing a thermally responsive polymer such as PNIPAM; pH-responsive polymers based on carboxylates or amines; or both simultaneously. The active component of these membranes is covalently grafted to the base membrane using methods that are not extendable to a wide variety of functionalities.

That is, while technologies exist that enable a membrane surface to be modified, they are very challenging and inefficient. A goal for 'smart membrane' technology is to offer a wide range of membrane functionality to suit an individual application, but today such customization can be expensive.

SUMMARY

In one aspect, the present disclosure provides a method of customizing a membrane that is simple and robust enough to be completed by the membrane users, so that a single base membrane can be produced in high volume, and optimized for each application as needed.

In another aspect, the present disclosure provides methods for preparing a functionalized conductive membrane comprising: electrochemically depositing a metal layer on a surface of a conductive membrane to provide a metallized conductive membrane; and contacting the metallized conductive membrane with a first solution comprising, either (i) at least one electrochemically active compound or (ii) at least one surface-modifying compound, to provide a functionalized conductive membrane.

In another aspect, the present disclosure provides functionalized membranes prepared according the preceding aspect and any embodiment thereof.

In another aspect, the present disclosure provides functionalized membranes comprising: a conductive membrane and a functionalized metal layer disposed over a surface of the conductive membrane, wherein the metal layer is (i) chemically bonded to one or more electroactive compounds or (ii) chemically bonded or coordinated to at least one surface modifying compound.

In another aspect, the present disclosure provides filtration membrane modules comprising a membrane as described herein.

In another aspect, the present disclosure provides methods comprising subjecting a functionalized membrane, as described herein, to conditions suitable for removing the metal layer from the conductive membrane.

In another aspect, the present disclosure provides methods for changing the pore size of a porous membrane comprising: contacting a functionalized membrane, as described herein, with metal nanoparticles, wherein the electrochemically active compounds or surface-modifying compounds each comprise functional groups; at least a portion of the functional groups are capable of bonding to or coordinating to the nanoparticles; and the membrane is a porous membrane.

In another aspect, the present disclosure provides methods for changing the pore size of a porous membrane comprising, contacting a membrane with a solution, wherein the membrane is a porous membrane; and the solution comprises electrochemically active compounds or surface-modifying compounds, each comprising functional groups; and at least a portion of the functional groups comprise the nanoparticles; and electrochemically depositing the electrochemically active compound on a surface of the membrane.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure provides air and/or water filtration membranes that are simple to modify and methods for their modification by electrodeposition onto a metal-coated membrane in a robust process. In one embodiment, the disclosure provides air filtration membranes. In another embodiment, the disclosure provides water filtration membranes. By using the concepts described herein, a single base membrane module can be created, and then the surfaces thereof modified with functional components directed for a particular application.

One illustrative goal of this concept is to build a membrane system that allows the surface to be modified with a functional group, and later be reset so that it can be used again, but optimized for a different application. This concept accomplishes "reprogramming" the membrane surface by using a "primer" layer of electrodeposited metal in between the base membrane and the functional coating. This metal layer can be electrochemically stripped after use.

Figure 1:
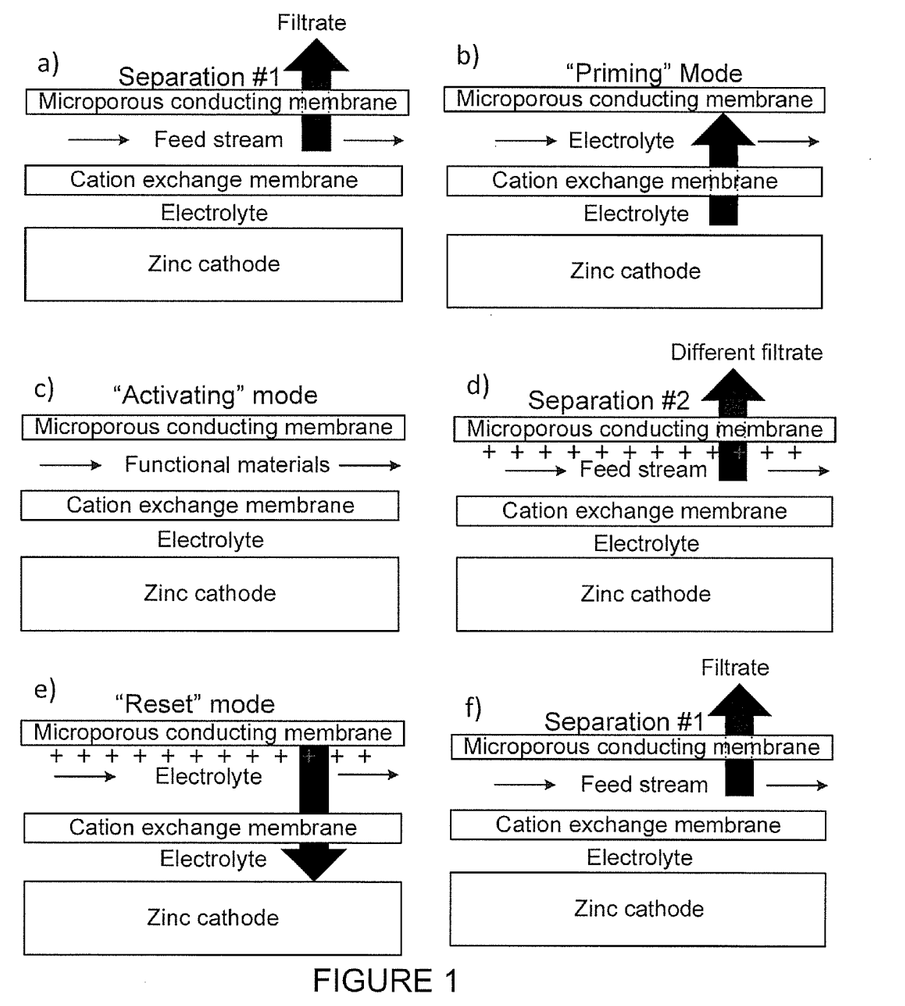
FIG. 1 illustrates a method for an end user to prepare a modified membrane, regenerate the original membrane, and optionally, re-modify the membrane for another use.

An example of such a method for cross-flow water filtration is shown in FIG. 1. FIG. 1, panel (a) shows the operation of a microporous conducting membrane in its original configuration for filtering a feed stream where the filtrate moves normal to the direction of the feed stream and across the microporous conducting membrane, as shown by the vertical arrow (Separation #1). This is a standard process for separations similar to those performed by any micro- or ultra-filtration system. FIG. 1, panel (b) shows the "priming" mode where the feed stream is replaced with an electrolyte. In one illustrative example, zinc metal can be electrochemically transferred from the zinc anode onto the surface of the microporous conducting membrane as shown by the vertical arrow, to form a zinc "primer" (many other metals can be applied here, as discussed below). A metal can also be reduced onto the microporous conducting membrane from a salt present in the electrolyte as described below (e.g., copper from copper sulfate in the electrolyte). FIG. 1, panel (c) shows the "activating" mode where a functional material is added to the electrolyte, and thereby electroreduced onto the "primer" (e.g., a zinc primer; shown as a thick line on the lower side of the microporous conducting membrane, deposited by the process of panel (b)) to impart an additional and/or different functionality to the microporous conducting membrane base system shown in FIG. 1(a). FIG. 1, panel (d) shows the operation of the newly functionalized microporous conducting membrane shown as a thick line (metal primer layer) and ++ symbols (surface functionalization deposited by the process of panel (c)) for filtering a feed stream as in FIG. 1, panel (a), but with a "different filtrate" as output as a result of functionalization ("Separation #2"). FIG. 1, panel (e) shows the "reset" mode where the "primer" layer can be removed by applying a reverse bias to oxidize the metal. Stripping the primer layer also removes the functional layer attached via the primer, thereby restoring the original base configuration of the microporous conducting membrane. FIG. 1, panel (f) shows the operation of the reconditioned microporous conducting membrane for filtering a feed stream results in the "filtrate" observed during the original separation by the microporous conducting membrane shown in FIG. 1, panel (a). The microporous conducting membrane system can be repurposed as desired, for example, by providing a new metal and/or functional material coating by repeating the process of panel (b), or panels (b) and (c).

The membranes and methods described herein have many advantages that allow for relatively rapid industrial implementation. The membranes are "programmable" and can be adjusted to perform many different types of separations, including but not limited to changes to catalytic activity, pore size, surface chemistry, etc., as discussed below. The membranes are simple to modify, requiring only high-efficiency, robust electrochemical reactions to be performed. As a result, the functionalization and reuse of the membrane can be accomplished by the customer, presumably with on-site technicians. The membranes are reversible, reconfigurable, and reusable. For example, a membrane that is programmed to have a small pore size in a first application may be regenerated by removing the active complex, and the membrane may be reused, for instance as a catalytic system in a second application. A single base membrane can be used for many different applications. As a result, the membrane system benefits from substantial economies of scale compared with other smart systems, which must be crafted separately for each application. For example, a user may wish to reconfigure the membrane in the field, for example from microporous (which has higher fluxes) to nanoporous (which sacrifices flux in order to filter out smaller contaminants). Alternatively, a user may wish to switch between a catalytic membrane and a normal one, or between two catalytic membranes that target different materials.

Thus, reversibly-functionalized membranes can be prepared according to a method including electrochemically depositing a metal layer on a surface of a conductive membrane to provide a metallized conductive membrane; and contacting the metallized conductive membrane with a first solution including either (i) at least one electrochemically active compound; or (ii) at least one surface-modifying compound, to provide a functionalized conductive membrane.

The conductive membrane can be any membrane familiar to those skilled in the art which is capable of being used as a cathode or anode in an electrochemical cell. For example, the conductive membrane can be a metal membrane, such as, but not limited to a stainless steel membrane. Examples of suitable stainless steel membranes include, but are not limited to, stainless steel filtration membranes available from Hitachi Metals (Japan) having an average pore size of about 0.50 μm to about 1.85 μm (e.g., 0.51 μm, or 1.03 μm, or 1.51 μm, or 1.83 μm).

In another example, the conductive membrane can include a polymer and carbon nanotubes. Such polymeric conductive membranes can be fabricated using conventional materials and methods. These membranes are conductive, and serve as an electrode in a membrane module when the nanotubes are applied in a loading between about 0.1 wt % and about 10 wt %. In certain embodiments, the nanotubes are applied in a loading between about 0.5 wt % and about 10 wt %; or about 1 wt % and 10 wt %; or above about 1 wt %.

In certain embodiments, the conductive membrane can include a polymer that is a polycarbonate, a polyimide, or a cellulose.

In one embodiment, the polymer is a polycarbonate. The term "polycarbonate" as used herein refers to those polymers whose repeat units are chemically bonded through —OC(O)O— groups. Examples of polycarbonates include, but are not limited to, poly(aromatic)carbonates, such as, poly(4,4'-(1-methylethylidene)bisphenol-co-carbonic acid); and poly(alkyl)carbonates, such as, poly(ethylene glycol-co-carbonic acid).

In other embodiments, the polymer is a polyimide. The term "polyimide" as used herein means a polymer which can be formed from condensation of dianhydride and diamine monomers. An example of a polyimide is Kapton™ (poly(4,4'-oxydiphenylene-pyromellitimide)) which can be prepared by the condensation of pyromellitic dianhydride and 4,4'-oxydiphenylamine.

In yet other embodiments, the polymer is a cellulose. The term "cellulose" as used herein means a polysaccharide consisting of a linear chain of β(1→4) linked D-glucose units, ethers thereof, esters thereof, and mixtures thereof. Examples of celluloses include, but are not limited to, cellulose acetate, cellulose triacetate, cellulose propionate, cellulose acetate propionate, cellulose acetate butyrate, methylcellulose, ethylcellulose, hydroxyethylcellulose, hydroxypropylcellulose, hydroxyethylmethylcellulose, hydroxypropylmethylcellulose, and mixtures thereof.

The nanotubes can be any carbon nanotubes known to those skilled in the art, provided that the nanotubes are conductive. As used herein, "carbon nanotube" refers to nanoscale tubes made substantially of carbon atoms, having a structure based on graphite basal planes that are wrapped or curled to become a tube. The carbon nanotubes may have a variety of lengths, diameters, chiralities (helicities), number of walls, and they may be either open or capped at their ends. Furthermore, they may be chemically functionalized in a variety of manners. These could include semiconducting (bandgaps ~1-2 eV), semi-metallic (bandgaps ~0.001-0.01 eV) or metallic carbon nanotubes (bandgaps ~0 eV), and more particularly mixtures of the three types. Carbon nanotubes can have a diameter of from about 2 Å to over 20 µm. However, in one aspect, the carbon nanotubes may be single walled tubes. In another aspect, the nanotubes may be multiple walled.

In another embodiment, the nanotubes are acid-treated nanotubes. The term "acid-treated nanotubes" as used herein refers to conductive carbon nanotubes, that as a result of treatment with a strong acid, such as but not limited to, sulfuric acid, nitric acid, hydrofluoric acid, and mixtures thereof, have surface groups, such as but not limited to sulfonate and carboxylic acid groups, that can coordinate metal ions and/or metal nanoparticles. See, Rakov, "Chemistry of Carbon Nanotubes," in *Nanotubes and Nanofibers*, Gogotsi, Y., ed., Taylor & Francis (Boca Raton, Fla.) 2006, pp 37-108.

A conductive membrane containing nanotubes can be prepared by casting a solution of the nanotubes and the polymer according methods familiar to those skilled in the art, such as, but not limited to, solvent evaporation, spray-drying, spin-coating, doctor-blading, and the like. In one embodiment, the conductive membrane containing the carbon nanotubes can be formed by preparing a solution containing the polymer and the conductive carbon nanotubes; and casting the second solution to provide the membrane. In one example, acid-treated nanotubes can be dispersed in a solvent such as N,N-dimethylacetamide (DMAc) and a polymer solution in DMAc is mixed with the nanotube dispersion, to create a single solution with both components. The membrane is cast as a thin film onto a porous support. Suitable solutions include a solvent capable of dissolving or suspending the polymer and nanotubes in a homogeneous manner.

Alternatively, for preparing a conductive membrane containing an essentially insoluble polymer, the membrane may be prepared by forming a solution of the nanotubes and a pre-polymer, such as a poly(amic acid), a polyimide precursor. A conductive membrane may be cast as described above, any residual solvent evaporated, and the membrane thermally treated under conditions suitable for imidization of the poly(amic) acid. A suitable temperature can readily be determined by one skilled in the art, for example, by thermal gravimetric analysis to determine the temperature at which the pre-polymer loses water. For example, see, Zhu et al, *Composite Sci. Tech.* 2006, 66, 548-554, which is hereby incorporated by reference in its entirety.

In another embodiment, the conductive membrane can be prepared by filtering a solution of the conductive carbon nanotubes through a commercially porous membrane. In such methods, the conductive membrane can be a microporous membrane or a nanoporous membrane. Microporous membranes can have average pore diameters of about 1.0 µm to about 100 µm. For example, the nanotubes are suspended in water at 0.01% solution, and the solution is passed through the membranes. The nanotubes should have lengths greater than about 1 µm, so they do not pass through the membrane and the carbon nanotubes are caught; i.e., longer than the pore size of the membrane. For example, if the membrane pore size is 10 nm, the nanotube lengths can be from 10 nm to less than 1 µm. In another example, the nanotubes can have lengths ranging from 1 µm to 1000 µm. The volume of liquid is chosen so that a film of roughly about 10 nm to about 1000 nm is created, where the film's conductivity can be confirmed by a simple two-point probe measurement.

In certain embodiments, the porous membrane is a nanoporous membrane. Nanoporous membranes can have average pore diameters of about 0.01 µm to about 1.0 µm. In certain other embodiments, the nanoporous membrane is a track-etched membrane. Examples of suitable track-etched membranes include, but are not limited to Nuclepore® (Whatman, Piscataway, N.J.) track-etched polycarbonate membrane having an average pore diameter between about 0.015 µm and 12.0 µm. For example, the track-etched membranes can have an average pore diameter that is about 0.015 µm, or 0.05 µm, or 0.08 µm, or 0.10 µm, or 0.20 or 0.40 µm, or 0.60 µm, or 0.80 µm, or 1.0 µm, or 2.0 µm, or 3.0 µm, or 5.0 µm, or 8.0 µm, or 10.0 µm, or 12.0 µm. Other suitable materials include "ultraporous" membranes, such as the Puron™ membranes (Koch Membrane Systems, Wilmington, Mass.), having, for example, an average pore diameter of about 0.05 µm.

The metal layer can be deposited on a surface of the conductive membrane according to any electrochemical methods familiar to those skilled in the art to provide a metallized conductive membrane. For example, the metal layer can include, but is not limited to, Au, Ag, Cu, Ni, Zn, or Pt. In certain embodiments, the metal layer includes Au, Ag, or Cu. In other embodiments, the metal layer includes Au. In other embodiments, the metal layer includes Ag. In other embodiments, the metal layer includes Cu.

In one suitable method, the metal layer can be deposited by contacting the conductive membrane with a second solution, wherein the second solution includes a metal salt, under conditions suitable for electrodeposition of the desired metal layer.

The deposition conditions can include, but are not limited to, standard electrochemical deposition methods or electroless methods in the presence of a chemical reductant. The metal salt can be, for example, an Au, Ag, Cu, Ni, Zn, or Pt salt. Suitable salts include, but are not limited to, auric acid, nickel sulfate, silver sulfate, copper sulfate, gold sulfate, gold thiosulfate, zinc sulfate, zinc chloride, platinum sulfate, and platinum chloride. In one particular example, the second solution can contain about 0.5 M zinc chloride and about 0.4 M boric acid.

The metal layer can be continuous over an entire surface of the conductive membrane or discontinuous, that is, pinholes are tolerable. The level of pinholes will be determined by the specification for a given application. The layer should be sufficiently continuous and have sufficient coverage to provide the desired function. However, perfect coverage is not required. In certain embodiments, greater than 10% of the surface of the conductive membrane is coated by the deposited metal layer. In certain other embodiments, greater than 20%; or greater than 30%; or greater than 40%; or greater than 50%; or greater than 60%; or greater than 70%; or greater than 80%; or greater than 90%; or greater than 95%; or greater than 98%; or greater than 99% of the surface of the conductive membrane is coated by the deposited metal layer.

The minimum thickness of the metal layer will be controlled by the pinhole spec for a given application. For example, for a porous membrane to be activated in all the pores, the coating should be a thick enough coating to ensure that all of the pores will be chemically altered, but thin enough to not plug the pores. In certain embodiments, the coating can have a thickness of about 50 nm to about 1000 nm. In certain embodiments, the coating can have a thickness of about 50 nm to about 500 nm; or about 50 nm to about 250 nm; or about 50 nm to about 100 nm. In one particular embodiment, the metal layer is a Zn layer having a thickness of about 50 nm to about 100 nm (e.g., 100 nm). Thickness can be determined by coulometry as is familiar to those skilled in the art.

Following deposition of the metal layer, the metallized conductive membrane is contacted with the first solution including either (i) at least one electrochemically active compound; or (ii) at least one surface-modifying compound, to provide a functionalized conductive membrane.

The term "surface-modifying compound" refers to chemical entities that include at least one chemical group capable of reacting with or coordinating to a metal layer surface. For example, compounds including thiol end groups (—SH) are known to associate with metal surfaces, such as silver, gold, and copper surfaces. Thiols can coat the surface at a concentration of about 0.1 mM to about 10 mM; or about 0.5 mM to about 10 mM; or about 1 mM to about 10 mM; or about 1 mM to about 5 mM; or about 1 mM concentration.

In another embodiment, a reactive monomer such as an acrylate, as defined herein, can be electrodeposited at the metal surface to form the subsequent layer. For example, a solution of acrylic acid in acidic conditions can polymerize on the electrode when oxidized at a potential of +0.9V at 1 mM concentration.

The metallized conductive membrane can be electrodeposited with functional molecules that change the properties of the membrane (for example, metallic nanoparticles to render it catalytically active; changing its hydrophilicity by grafting, for example, PEG; or altering its pore size by coordinating or bonding nanoparticles to the surface). In this way, a single base membrane may be optimized for a variety of functions during manufacture, at a later time, and/or at the point of use, enabling good economies of scale for the base membrane, and custom processes for the user.

To functionalize the metallized conductive membrane, the membrane is contacted with a solution containing one or more solvents stable under the relevant electrochemical conditions and at least one electrochemically active compound, wherein each electrochemically active compound contains at least one functional group. Solvents stable under the relevant electrochemical conditions may include water, acetonitrile, propylene carbonate, ethylene carbonate, and mixtures thereof. Either metals or organics can be electrodeposited on the membrane to change its properties according to the methods described herein.

The term "functional group" as used herein means a combination of atoms in a molecule, compound, composition or complex that tends to function as a single chemical entity and are responsible for the characteristic chemical properties and/or reactivity of that structure. Exemplary functional groups include, hydrocarbons, groups containing halogen, groups containing oxygen, groups containing nitrogen and groups containing phosphorus and/or sulfur. Examples of functional groups include, but are not limited to, —$NH_2$ (amine), —COOH (carboxyl), siloxane, —OH (hydroxyl), —SH (mercapto), —$CONH_2$ (amido), —$S(O)_2OH$ (sulfonate), —S(O)OH (sulfinate), —$OS(O)_2OH$ (sulfate), and chemical groups including the same. Other examples of functional groups include antibodies, enzymes, nanoparticles, and the like.

Electrochemical deposition occurs when a suitable electrochemical potential, as is familiar to those skilled in the art, is supplied to the system to induce deposition of the electrochemically active compound on the surface of the membrane to provide a functionalized membrane.

Many different organic moieties can be electroreduced onto the metallized conductive membrane surface. The term "electrochemically active" as used herein means the compound is capable of forming a chemical bond with another compound, such as a nanotube, when exposed to electrooxidative or electroreductive conditions, as are familiar to those skilled in the art. In one embodiment, each electrochemically active compound is an electropolymerizable monomer, such as but not limited to acrylonitrile, N-vinylcarbazole, a (meth)acrylate, a styrene, an aniline, a thiophene, or a pyrrole. See, Balasubramanian and Burghard, *J. Mater. Sci.* 2008, 18, 3071-3083, which is hereby incorporated by reference in its entirety.

For example, each monomer can be, independently, a (meth)acrylate. As used herein, the use of the term "(meth)" followed by another term such as acrylate refers to both acrylates and methacrylates. For example, the term "(meth)acrylate" refers to either acrylate or methacrylate, and esters thereof; the term "(meth)acrylic" refers to either acrylic or methacrylic; the term "(meth)acrylic acid" refers to either acrylic acid or methacrylic acid. In certain embodiments, "(meth)acrylates" are independently compounds of the formula, or a salt thereof, wherein $R^1$ is hydrogen, $C_1$-$C_{10}$ haloalkyl, $C_2$-$C_{10}$ alkenyl, $C_2$-$C_{10}$ alkynyl, $C_1$-$C_{10}$ alkyl, aryl, heteroaryl, heterocyclyl, $C_3$-$C_8$ cycloalkyl, aryl($C_1$-$C_6$)alkyl, heteroaryl($C_1$-$C_6$)alkyl, ($C_3$-$C_8$)cycloalkyl($C_1$-$C_6$)alkyl, or heterocyclyl($C_1$-$C_6$)alkyl, each optionally substituted with halogen, cyano, nitro, —$N(R^3)_2$, —$N(R^3)_3{}^+A^-$, —$OR^3$, —$SR^3$, —$S(O)_2OR^3$, —$C(O)OR^3$, —$C(O)N(R^3)_2$, —OC(O)$OR^3$, —$N(R^3)C(O)OR^3$, —$N(R^3)C(O)N(R^3)_2$, or —$O[CH_2CH_2O]_qR^3$, wherein q is 1 to 250, each $R^3$ is independently hydrogen or $C_1$-$C_6$ alkyl; $R^2$ is hydrogen or methyl, and $A^-$ is an anion (e.g., a halide). Modification of the carbon nanotube surface with a (meth)acrylate can provide a surface coating having the formula, where n is greater than 2.

In another example, each monomer can be, independently, a styrene. The term "styrene" as used herein means a compound of the formula, wherein p is 0, 1 or 2; and each $R^1$ is independently hydrogen, $C_1$-$C_{10}$ haloalkyl, $C_2$-$C_{10}$ alkenyl, $C_2$-$C_{10}$ alkynyl, $C_1$-$C_{10}$ alkyl, aryl, heteroaryl, heterocyclyl, $C_3$-$C_8$ cycloalkyl, aryl($C_1$-$C_6$)alkyl, heteroaryl($C_1$-$C_6$)alkyl, ($C_3$-$C_8$)cycloalkyl($C_1$-$C_6$)alkyl, or heterocyclyl($C_1$-$C_6$)alkyl, each optionally substituted with halogen, cyano, nitro, —$N(R^{30})_2$, —$N(R^{30})_3{}^+A^-$, —$OR^{30}$, —$SR^{30}$, —$S(O)_2OR^{30}$, —C(O)

OR$^{30}$, —C(O)N(R$^{30}$)$_2$, —OC(O)OR$^{30}$, —N(R$^{30}$)C(O)OR$^{30}$, —N(R$^{30}$)C(O)N(R$^{30}$)$_2$, or —O[CH$_2$CH$_2$O]$_q$R$^{30}$, wherein q is 1 to 250, each R$^{30}$ is independently hydrogen or C$_1$-C$_6$ alkyl; and A$^-$ is an anion (e.g., a halide). Modification of the carbon nanotube surface with a styrene can provide a surface coating having the formula, where m is greater than 2.

Figure 2:
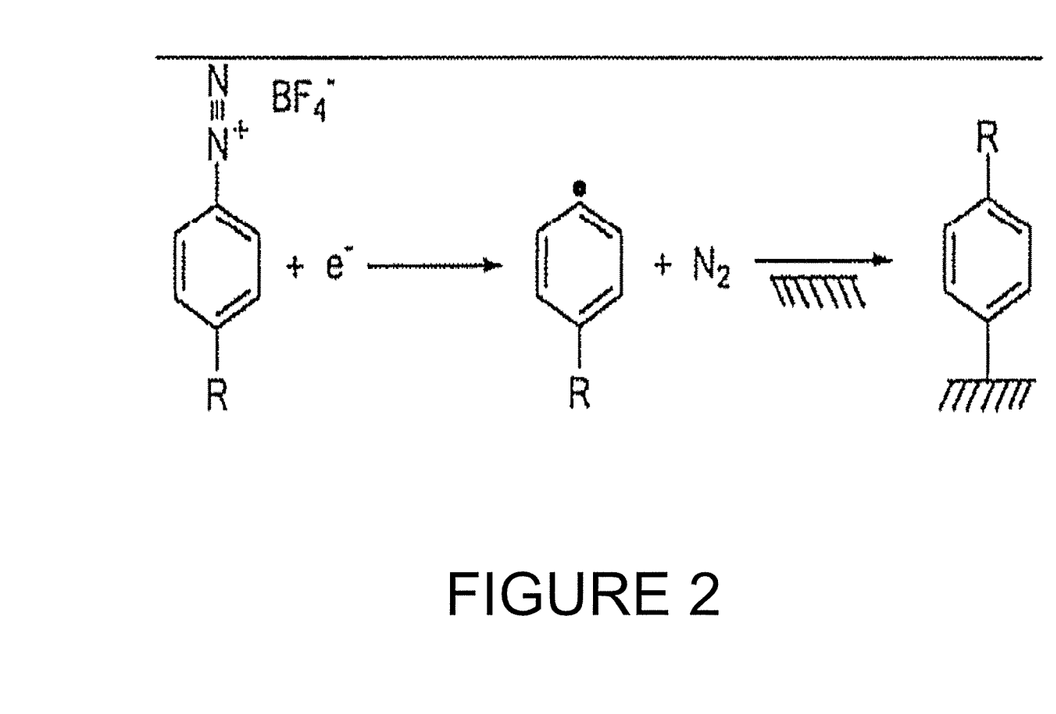
FIG. 2 illustrates the electroreduction of a diazonium salt to attach a functionalized radical to a metal surface.

In another embodiment, the electrochemically active compound is a diazonium salt. Electrochemical reduction of the diazonium salt can release nitrogen to form a radical which can react with the nanotubes in the membrane to functionalize the surface of the membrane, as shown in FIG. 2.

In one embodiment, the electrochemically active compound is an aryl diazonium salt, wherein the aryl group is substituted with at least one functional group, either directly or through a linker. The functional group can be directly bonded to the phenyl or can be operatively connected to the phenyl through a linking group. An example of a linking group is a group of the formula, wherein Q is a bond, aryl, heteroaryl, C$_3$-C$_8$ cycloalkyl, or heterocyclyl; and no more than one methylene in each alkyl group is optionally and independently replaced by —O—, —S—, —N(R$^{00}$)—, —C(H)=C(H)—, —C≡C—, —C(O)—, —S(O)—, —S(O)$_2$—, —P(O)(OH)—, —OP(O)(OH)—, —P(O)(OH)O—, —N(R$^{00}$)P(O)(OH)—, —P(O)(OH)N(R$^{00}$)—, —OP(O)(OH)O—, —OP(O)(OH)N(R$^{00}$)—, —N(R$^{00}$)P(O)(OH)O—, —N(R$^{00}$)P(O)(OH)N(R$^{00}$)—, —C(O)O—, —C(O)N(R$^{00}$)—, —OC(O)—, —N(R$^{00}$)C(O)—, —S(O)O—, —OS(O)—, —S(O)N(R$^{00}$)—, —N(R$^{00}$)S(O)—, —S(O)$_2$O—, —OS(O)$_2$—, —S(O)$_2$N(R$^{00}$)—, —N(R$^{00}$)S(O)$_2$—, OC(O)O—, —OC(O)N(R$^{00}$)—, —N(R$^{00}$)C(O)O—, —N(R$^{00}$)C(O)N(R$^{00}$)—, —OS(O)O—, —OS(O)N(R$^{00}$)—, —N(R$^{00}$)S(O)O—, —N(R$^{00}$)S(O)N(R$^{00}$)—, —OS(O)$_2$O—, —OS(O)$_2$N(R$^{00}$)—, —N(R$^{00}$)S(O)$_2$O—, or —N(R$^{00}$)S(O)$_2$N(R$^{00}$)—, wherein each R$^{00}$ is independently hydrogen or C$_1$-C$_6$ alkyl.

In one example, the at least one functional group is a second polymer, an antibody, or an enzyme. In another example, the second polymer can be a polyethylene glycol, a poly carboxylic acid, a polycation as described below, or a polyanion, as described below.

"Poly carboxylic acids" refer to polymers having free carboxylic acid side-chains. Examples of poly carboxylic acids include, but are not limited to poly(acrylic acid), poly(maleic acid), and co-polymers thereof, e.g., poly(acrylic acid-co-maleic acid)poly(acrylic acid-co-(2-acrylanmido-2-methyl-propanesulfonic acid)), and poly(acrylic acid-co-acetonitrile). Poly carboxylic acids can chelate metals such as iron, palladium, platinum, gold, silver, and copper, and nanoparticles thereof, or metal ions, such and Fe$^{2+}$, Fe$^{3+}$, Pt$^{2+}$, Pt$^{4+}$, Pd$^{2+}$, Cu$^+$, Au$^+$, and Ag$^+$, which can be subsequently reduced to form a catalytic surface.

When a PEG chain is conjugated to a diazonium, the functionalized membrane can have a non-fouling surface. See Vadgama, P., ed. *Surfaces and Interfaces for Biomaterial*, CRC Press (Boca Raton, Fla.) 2005, pp. 763-776.

In another embodiment, each electrochemically active compound is independently of the formula, wherein R comprises the functional group and A$^-$ is a electrochemically acceptable anion. Modification of the carbon nanotube surface with a such a diazonium salt can provide a surface coating of an optionally cross-linked polyphenylene where the phenyl groups are each substituted with R.

The term "electrochemically acceptable anion" as used herein means an anion which does not substantially interfere with the electrochemical deposition of the electrochemically active compound. Examples of suitable anions include, but are not limited to, halides, perchlorate, tetrafluoroborate, and hexafluorophosphate.

In another embodiment, each electrochemically active compound is independently of the formula, wherein R comprises the functional group and A$^-$ is a electrochemically acceptable anion. Modification of the carbon nanotube surface with a such a diazonium salt can provide a surface coating of an optionally cross-linked polyphenylene where the phenyl groups are each substituted with R.

The electrodeposition of any of the preceding monomers can be, for example, under the conditions discussed in Pinson and Podvorica, *Chem. Soc. Rev.* 2005, 34, 429-439 which is hereby incorporated by reference in its entirety. The monomer (e.g., aryl diazonium salt, (meth)acrylate, styrene, etc.) can be dissolved at a concentration of about 1 mM to about 10 mM in either an aprotic medium with a supporting electrolyte (e.g., acetonitrile+0.1 M tetrabutylammonium tetrafluoroborate) or in an acidic aqueous medium (e.g., 0.1 M H$_2$SO$_4$) and reduced using the surface to be modified as a cathode. The potential of the cathode can be set with the help of a potentiostat at the potential of the voltammetric peak of the monomer or at more cathodic (more negative) potential for a variable period of time (seconds to minutes). After the electroreduction, a thorough rinsing of the electrode (i.e., the membrane) can be used to remove any weakly adsorbed chemicals. See also, Waje et al., *Nanotechnology* 2005, 16, S395.

In a further example, a functional material (such as nanoparticles which can change the pore size of the membrane by forming a surface layer which physically fills in a portion of a functionalized membrane channels) can be conjugated to a diazonium salt, and reduction of the salt at the nanotube causes the formation of a covalent bond between the diazonium-conjugated polymer and the membrane.

In one example, platinum nanoparticles, can be the functional materials chemically conjugated to a diazonium salt. Such modification can transform the membrane into a catalytically active system capable of decomposing organic pollutants. Diazonium salts conjugated to the nanoparticles can be provided at a concentration of about 0.1 mM to about 10 mM. In certain embodiments, the diazonium-conjugates can be provided at a concentration between about 1 mM and 10 mM or about 0.1 mM and 1 mM; or about 0.5 mM and 10 mM; or about 1 mM and 5 mM.

In another example, sialic acid can be the functional material that is chemically conjugated to a diazonium salt. A sialic acid modified membrane can be used to presence of an influenza virus in the contacting solution. The sialic acid can conjugate to hemagglutinin activity (HA) glycoproteins on the surface of influenza viruses, hereby reducing the pore size (or even shut down) by occluding the membrane pores. Such binding can be detected, for example, by a change in the flow rate of a source being filtered by the functionalized membrane, either in a solution setting or in an air filtration setting. In water, it is also possible to pre-load a binding moiety with a fluorescent target that gets released on binding of a new target. In this case, the fluorescence of the target in the effluent would be monitored to detect binding. A similar approach may be used in some air filtration settings.

In another example, polyanions (e.g., cation-exchange media) such as sodium poly(styrenesulfonate), or poly(2-acrylamido-2-methyl-1-propanesulfonic acid), or polycations (e.g., anion-exchange media) such as poly (acrylamido-N-propyltrimethylammonium chloride), can be the functional material that is chemically conjugated to a diazonium salt. Such polyanions, can preferentially reject dications such as $Mg^{2+}$ and $Ca^{2+}$ over monocations such as $Na^+$. Such polycations, can preferentially reject dianions such as $SO_4^{2-}$ and $PO^{3-}$ over monoanions, such as $OH^-$, $F^-$, or $Cl^-$ for use in water softening.

A polycation used herein, refers to a polymer that possesses multiple positive charges at the pH of intended use, for example between pH 5 and 8. Examples of polycations include, but are not limited to, chitosan, or poly(arginine), poly(lysine), poly(ornithine), or another polycation such as a cationic organic polymer for example poly(ethyleneimine) or poly(allylamine).

The term polyanion, as used herein, refers to a polymer that possesses multiple negative charges at the pH of intended use, for example between pH 5 and 8. Examples of polyanions include, but are not limited to, anionic polysaccharides, for example heparin, alginic acid or hyaluronic acid, or another polyanion, for example an anionic organic polymer such as poly(acrylic acid), poly(methacrylic acid) or poly(acrylic-co-methacrylic acid).

Alternatively, following electrodeposition, the functionalized membrane can be contacted with another solution containing constituents (e.g., functional materials) which can react or associate with the functional groups that were previously deposited. For example, a nanoparticle-coated functionalized membrane can be prepared by contacting a functionalized membrane with nanoparticles, wherein at least a portion of the functional groups present are capable of bonding to or coordinating to the nanoparticles. In certain embodiment, the nanoparticles are metal nanoparticles and the functional groups on the surface of the membrane include carboxylic acid and/or sulfonic acid groups. In other embodiments, the nanoparticles are polymeric nanoparticles or silica nanoparticles, each have surface functionality that can bond to or coordinate with the functional groups on the surface of the membrane. In one example, one of the nanoparticles and the functionalized surface include activate ester groups (e.g., N-hydroxysuccinimidyl esters, 4-nitrophenol esters, or 2-nitrophenol esters) and the other includes amino groups.

The term "nanoparticles" as used herein means substantially spherical or irregularly shaped particles with an average diameter of between 1 nm and 1000 nm. The particles can contain a single chemical element or a single alloy; or can contain multiple elements or alloys inhomogeneous (e.g., core-shell) or inhomogeneous compositions. In certain embodiments, the nanoparticles have an average diameter of between 1 nm and 500 nm; or 1 nm and 250 nm; or 1 nm and 100 nm; or 1 nm and 50 nm; or 1 nm and 10 nm. The average diameter of the nanoparticles can be determined according to methods familiar to those skilled in the art, for example, by dynamic light scattering.

Examples of suitable functional groups for bonding or coordinating to nanoparticles include, but are not limited to, $-NH_2$, $-COOH$, $-OH$, $-SH$, and chemical compounds containing the same. Examples of nanoparticles which can be used include but are not limited to Au, Ag, or Pt nanoparticles and/or core-shell nanoparticles having a surface layer of Au, Ag, or Pt over any of the preceding nanoparticles (e.g., Au/Ag, Pt/Au, Ag/Au, or Au/Pt).

Ultimately, the original conductive membrane can be recycled by subjecting the functionalized membrane to conditions suitable for removing the metal layer from the conductive membrane to provide a clean membrane surface which may be re-functionalized according to the preceding methods. In certain embodiments, the conditions include electrochemical oxidation utilizing potentials and electrolytic solutions known to those skilled in the art for removing the metal layer. In other embodiments, the conditions include chemical oxidation. For example, chemical solutions available from Enthone, Inc. (a division of Cookson Group plc, London) can be used to remove the metal layer: ENSTRIP® 4000 (Copper, Nickel), ENSTRIP® AU-78 (Gold), ENSTRIP® C-38 (Copper), ENSTRIP® DZ (Nickel), ENSTRIP® NP (Nickel), ENSTRIP® NX (Gold), ENSTRIP® PM (Silver), ENSTRIP® S (Nickel, Copper, Silver, Zinc). The solutions are used in industry to chemically strip metals from a surface. In this application, they will remove the metal "primer", and thus release the optional functionalized coating as well to reveal the Membrane in its initial condition. If the original membrane is made conductive by nanotubes, for example, the nanotubes and original membrane material will not be affected by these etchants while metals will be quantitatively removed.

In another aspect, the disclosure provides the functionalized membranes prepared according to any of the embodiments described above.

In another aspect, the disclosure provides the functionalized membrane including a conductive membrane and a functionalized metal layer disposed over a surface of the conductive membrane, wherein the metal layer is (i) chemically bonded to one or more electroactive compounds or (ii) chemically bonded or coordinated to at least one surface-modifying compound.

In another aspect, the disclosure provides filtration membrane modules containing any of the membranes described above. In certain embodiments, the filtration membrane modules are air filtration membrane modules. In other embodiments, the filtration membrane modules are water filtration membrane modules and further comprise a counter electrode.

Figure 3:
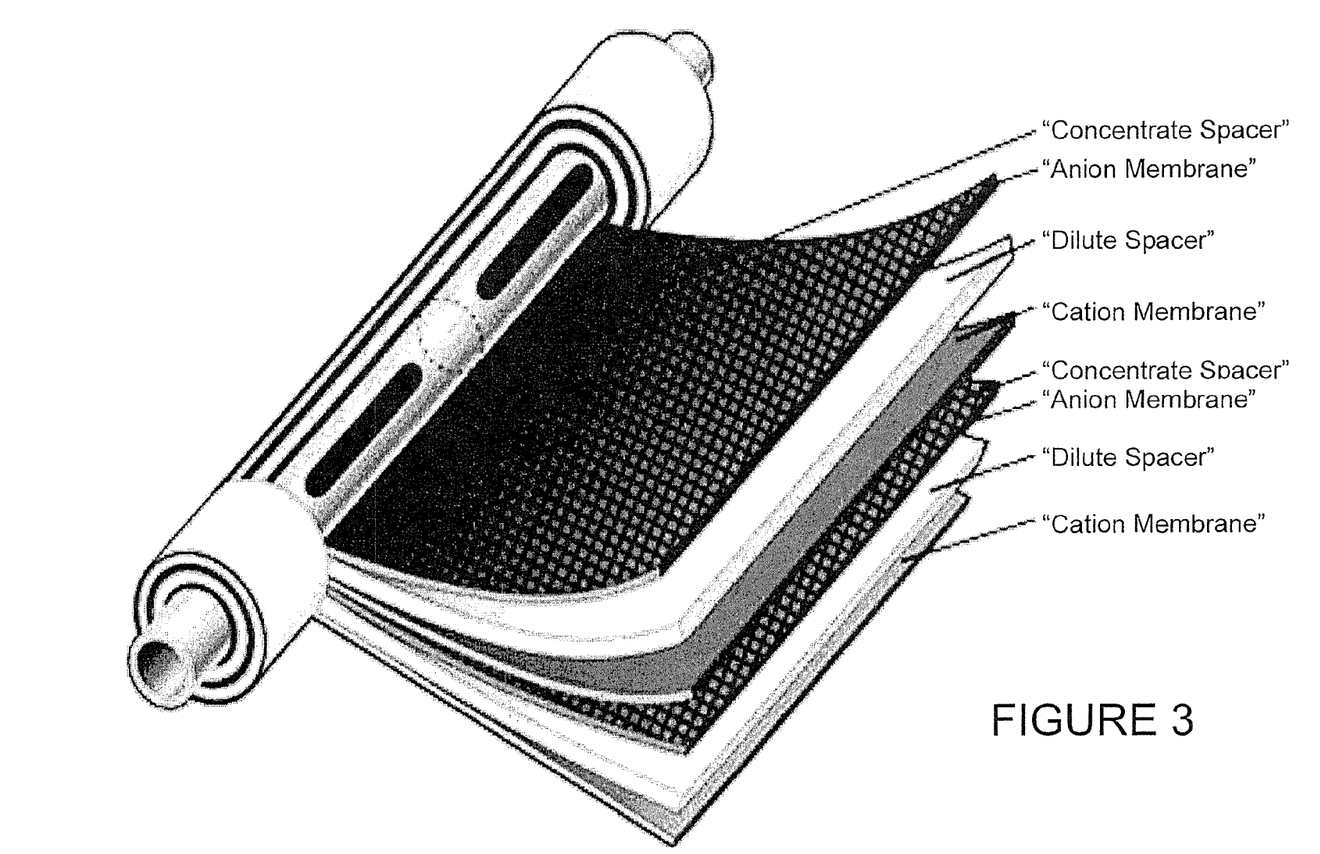
FIG. 3 shows a representative embodiment of a spiral wound membrane useful for electrodeionization.

Counterelectrodes can be fabricated from electrochemically inert materials such as gold, silver, platinum, or carbon. The concept of an electrically wired, electrochemically active membrane module has been demonstrated in electrodeionization (EDI), a technology that uses an electric field to draw salt out of an aqueous input stream. These systems may be constructed as spiral-wound modules as shown in FIG. 3, where the base membrane stack contains two electrodes (cathode and anode), separated by two ion-exchange membranes. One of the two electrodes can be the nanotube membrane and/or modified nanotube membrane as described above. In certain embodiments, a carbon counterelectrode can provide for electrochemical stability. Electrodes that are conductive because of carbon (nanotubes, carbon fibers, etc.) are useful because metal coatings can be removed, as noted above, in the presence of carbon without affecting the carbon.

An example of a spiral wound module for electrodeionization in which the membranes described herein can be used us U.S. Pat. No. 5,538,642, which is hereby incorporated by reference in its entirety.

In other embodiments, such water filtration membrane modules can contain three components, a nanotube membrane, as described above, the counterelectrode; and a separator disposed between the nanotube membrane and the counterelectrode. In this embodiment, an ion-exchange membrane is optional.

In another aspect, the disclosure provides methods for changing the pore size of a porous membrane by contacting a functionalized membrane, as described in any of the preceding embodiments, and wherein the membrane is a porous membrane, with metal nanoparticles, wherein the electrochemically active compounds or surface-modifying compounds each include functional groups; at least a portion of the functional groups are capable of bonding to or coordinating to the nanoparticles; and the membrane is a porous membrane. At least a portion of the functional groups present on the porous membrane are capable of bonding to or coordinating to the nanoparticles, and thereby, change the average pore size. The nanoparticles can have any average diameter suitable for changing the pore size to a desired average size. For example, a porous membrane having an average pore size of about 200 nm, upon contacting with about 50 nm nanoparticles, can see a decrease in average pore size to about 100 nm. In other examples, by using appropriately sized nanoparticles, an average pore size of about 100 nm can be reduced to about 50 nm; or an average pore size of about 100 nm can be reduced to about 25 nm; or an average pore size of about 100 nm can be reduced to about 10 nm; or an average pore size of about 200 nm can be reduced to about 100 nm; or an average pore size of about 200 nm can be reduced to about 75 nm; or an average pore size of about 200 nm can be reduced to about 50 nm; or an average pore size of about 200 nm can be reduced to about 25 nm; or an average pore size of about 200 nm can be reduced to about 10 nm; or an average pore size of about 500 nm can be reduced to about 250 nm; or an average pore size of about 500 nm can be reduced to about 100 nm; or an average pore size of about 500 nm can be reduced to about 50 nm; or an average pore size of about 1000 nm can be reduced to about 500 nm; or an average pore size of about 1000 nm can be reduced to about 250 nm; or an average pore size of about 1000 nm can be reduced to about 100 nm.

Alternatively, the disclosure provides methods for changing the pore size of a porous membrane including, contacting a metallized membrane as described above, with a solution, wherein the membrane is a porous membrane; and the solution includes electrochemically active compounds or surface-modifying compounds, each including functional groups; and at least a portion of the functional groups include the nanoparticles; and electrochemically depositing the electrochemically active compound on a surface of the metallized membrane. Examples of suitable membranes, conductive carbon nanotubes, electrochemically active compounds, functional groups, and nanoparticles, and representative changes in pore sized are as described above.

Definitions

The term "alkyl" as used herein, means a straight or branched chain hydrocarbon containing from 1 to 10 carbon atoms, unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. When an "alkyl" group is a linking group between two other moieties, then it may also be a straight or branched chain; examples include, but are not limited to —$CH_2$—, —$CH_2CH_2$—, —$CH_2CH_2CHC(CH_3)$—, —$CH_2CH(CH_2CH_3)CH_2$—.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system. The bicyclic aryl can be azulenyl, naphthyl, or a phenyl fused to a monocyclic cycloalkyl, a monocyclic cycloalkenyl, or a monocyclic heterocyclyl. The bicyclic aryl is attached to the parent molecular moiety through any carbon atom contained within the phenyl portion of the bicyclic system, or any carbon atom with the naphthyl or azulenyl ring. The fused monocyclic cycloalkyl or monocyclic heterocyclyl portions of the bicyclic aryl are optionally substituted with one or two oxo and/or thia groups. Representative examples of the bicyclic aryls include, but are not limited to, azulenyl, naphthyl, dihydroinden-1-yl, dihydroinden-2-yl, dihydroinden-3-yl, dihydroinden-4-yl, 2,3-dihydroindol-4-yl, 2,3-dihydroindol-5-yl, 2,3-dihydroindol-6-yl, 2,3-dihydroindol-7-yl, inden-1-yl, inden-2-yl, inden-3-yl, inden-4-yl, dihydronaphthalen-2-yl, dihydronaphthalen-3-yl, dihydronaphthalen-4-yl, dihydronaphthalen-1-yl, 5,6,7,8-tetrahydronaphthalen-1-yl, 5,6,7,8-tetrahydronaphthalen-2-yl, 2,3-dihydrobenzofuran-4-yl, 2,3-dihydrobenzofuran-5-yl, 2,3-dihydrobenzofuran-6-yl, 2,3-dihydrobenzofuran-7-yl, benzo[d][1,3]dioxol-4-yl, and benzo[d][1,3]dioxol-5-yl. In certain embodiments, the bicyclic aryl is (i) naphthyl or (ii) a phenyl ring fused to either a 5 or 6 membered monocyclic cycloalkyl, a 5 or 6 membered monocyclic cycloalkenyl, or a 5 or 6 membered monocyclic heterocyclyl, wherein the fused cycloalkyl, cycloalkenyl, and heterocyclyl groups are optionally substituted with one or two groups which are independently oxo or thia.

The term "arylalkyl" and "-alkylaryl" as used herein, means an aryl group, as defined herein, appended to the parent molecular moiety through an alkyl group, as defined herein. Representative examples of arylalkyl include, but are not limited to, benzyl, 2-phenylethyl, 3-phenylpropyl, and 2-naphth-2-ylethyl.

The term "cycloalkyl" as used herein, means a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloalkyl ring where two non-adjacent carbon atoms of the monocyclic ring are linked by an alkylene bridge of between one and three additional carbon atoms (i.e., a bridging group of the form —$(CH_2)_w$—, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring. Cycloalkyl groups are optionally substituted with one or two groups which are independently oxo or thia. In certain embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thia.

"Cycloalkenyl" as used herein refers to a monocyclic or a bicyclic cycloalkenyl ring system. Monocyclic ring systems are cyclic hydrocarbon groups containing from 3 to 8 carbon atoms, where such groups are unsaturated (i.e., containing at least one annular carbon-carbon double bond), but not aromatic. Examples of monocyclic ring systems include cyclopentenyl and cyclohexenyl. Bicyclic cycloalkenyl rings are bridged monocyclic rings or a fused bicyclic rings. Bridged monocyclic rings contain a monocyclic cycloalkenyl ring where two non-adjacent carbon atoms of the monocyclic ring are linked by an alkylene bridge of between one and three additional carbon atoms (i.e., a bridging group of the form —(CH$_2$)$_w$—, where w is 1, 2, or 3). Representative examples of bicyclic cycloalkenyls include, but are not limited to, norbornenyl and bicyclo[2.2.2]oct-2-enyl. Fused bicyclic cycloalkenyl ring systems contain a monocyclic cycloalkenyl ring fused to either a phenyl, a monocyclic cycloalkyl, a monocyclic cycloalkenyl, a monocyclic heterocyclyl, or a monocyclic heteroaryl. The bridged or fused bicyclic cycloalkenyl is attached to the parent molecular moiety through any carbon atom contained within the monocyclic cycloalkenyl ring. Cycloalkenyl groups are optionally substituted with one or two groups which are independently oxo or thia.

The term "halo" or "halogen" as used herein, means —Cl, —Br, —I or —F.

The term "halide" as used herein means a fluoride, chloride, bromide, or iodide anion.

The term "haloalkyl" as used herein, means at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, and 2-chloro-3-fluoropentyl.

The term "heteroaryl," as used herein, means a monocyclic heteroaryl or a bicyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 6 membered heteroaryl is connected to the parent molecular moiety through any carbon atom or any nitrogen atom contained within the heteroaryl. Representative examples of monocyclic heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, and triazinyl. The bicyclic heteroaryl consists of a monocyclic heteroaryl fused to a phenyl, a monocyclic cycloalkyl, a monocyclic cycloalkenyl, a monocyclic heterocyclyl, or a monocyclic heteroaryl. The fused cycloalkyl or heterocyclyl portion of the bicyclic heteroaryl group is optionally substituted with one or two groups which are independently oxo or thia. When the bicyclic heteroaryl contains a fused cycloalkyl, cycloalkenyl, or heterocyclyl ring, then the bicyclic heteroaryl group is connected to the parent molecular moiety through any carbon or nitrogen atom contained within the monocyclic heteroaryl portion of the bicyclic ring system. When the bicyclic heteroaryl is a monocyclic heteroaryl fused to a phenyl ring, then the bicyclic heteroaryl group is connected to the parent molecular moiety through any carbon atom or nitrogen atom within the bicyclic ring system. Representative examples of bicyclic heteroaryl include, but are not limited to, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, purinyl, 5,6,7,8-tetrahydroquinolin-2-yl, 5,6,7,8-tetrahydroquinolin-3-yl, 5,6,7,8-tetrahydroquinolin-4-yl, 5,6,7,8-tetrahydroisoquinolin-1-yl, thienopyridinyl, 4,5,6,7-tetrahydrobenzo[c][1,2,5]oxadiazolyl, and 6,7-dihydrobenzo[c][1,2,5]oxadiazol-4(5H)-onyl. In certain embodiments, the fused bicyclic heteroaryl is a 5 or 6 membered monocyclic heteroaryl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused cycloalkyl, cycloalkenyl, and heterocyclyl groups are optionally substituted with one or two groups which are independently oxo or thia.

The term "heteroarylalkyl" and "-alkylheteroaryl" as used herein, means a heteroaryl, as defined herein, appended to the parent molecular moiety through an alkyl group, as defined herein. Representative examples of heteroarylalkyl include, but are not limited to, fur-3-ylmethyl, 1H-imidazol-2-ylmethyl, 1H-imidazol-4-ylmethyl, 1-(pyridin-4-yl)ethyl, pyridin-3-ylmethyl, pyridin-4-ylmethyl, pyrimidin-5-ylmethyl, 2-(pyrimidin-2-yl)propyl, thien-2-ylmethyl, and thien-3-ylmethyl.

The term "heterocyclyl" as used herein, means a monocyclic heterocycle or a bicyclic heterocycle. The monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains 1 heteroatom selected from the group consisting of O, N and S. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The monocyclic heterocycle is connected to the parent molecular moiety through any carbon atom or any nitrogen atom contained within the monocyclic heterocycle. Representative examples of monocyclic heterocycle include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to either a phenyl, a monocyclic cycloalkyl, a monocyclic cycloalkenyl, a monocyclic heterocycle, or a monocyclic heteroaryl. The bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. Heterocyclyl groups are optionally substituted with one or two groups which are independently oxo or thia. In certain embodiments, the bicyclic heterocyclyl is a 5 or 6 membered monocyclic heterocyclyl ring fused to phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the bicyclic heterocyclyl is optionally substituted by one or two groups which are independently oxo or thia.

The term "oxo" as used herein means a =O group.

The term "saturated" as used herein means the referenced chemical structure does not contain any multiple carbon-carbon bonds. For example, a saturated cycloalkyl group as defined herein includes cyclohexyl, cyclopropyl, and the like.

The term "thia" as used herein means a =S group.

The term "unsaturated" as used herein means the referenced chemical structure contains at least one multiple carbon-carbon bond, but is not aromatic. For example, a unsaturated cycloalkyl group as defined herein includes cyclohexenyl, cyclopentenyl, cyclohexadienyl, and the like.

EXAMPLES

Example 1

Modification and Recycling of a Stainless Steel Membrane

Stainless steel membranes are available from Hitachi Chemical Company. Copper is electrodeposited to add the metal layer and the copper layer is functionalized by electrografting diazonium conjugated antibodies. Before modification, the membrane has a passive stainless steel surface. After conjugation of an antibody, the membrane pores can collapse in the presence of a target molecule, for example a virus protein. Thus, the membrane will not only filter out viruses, it will warn the user of the presence of the virus by reducing the pore size, which reduces the flow rate. Thus, high flows (with lower filter efficiencies) can be achieved in the absence of the target molecule, and lower flow rates (with restricted pores) happen in the presence of the target. Ultimately, the copper is stripped with ENSTRIP® S-180 to regenerate the stainless steel surface.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for preparing a functionalized and re-metallized conductive membrane, the method comprising:
   electrochemically depositing a first metal layer on a surface of a conductive membrane to form a metallized conductive membrane;
   forming a functionalized conductive membrane configured as a first filtration membrane by contacting the metallized conductive membrane with a first solution comprising, either
      at least one first electrochemically active compound; or
      at least one first surface-modifying compound;
   removing the first metal layer from the functionalized conductive membrane by subjecting the functionalized conductive membrane to one or more conditions suitable for removing the first metal layer from the functionalized conductive membrane;
   electrochemically depositing another metal layer on the surface of the conductive membrane having the first metal layer removed therefrom; and
   functionalizing the re-metallized conductive membrane by contacting the re-metallized conductive membrane with another solution comprising at least one second electrochemically active compound or at least one second surface-modifying compound effective to form the functionalized and re-metallized conductive membrane configured as a second filtration membrane;
   wherein the at least one second electrochemically active compound or at least one second surface-modifying compound is different from the at least one first electrochemically active compound or the at least one first surface-modifying compound, respectively.

2. The method of claim 1, wherein depositing the second metal layer is carried out by contacting the conductive membrane with a second solution, wherein the second solution comprises a metal salt.

3. The method of claim 1, wherein the conductive membrane comprises a metal membrane.

4. The method of claim 1, wherein the conductive membrane comprises a polymer and conductive carbon nanotubes.

5. The method of claim 4, wherein the conductive carbon nanotubes comprise single-walled carbon nanotubes or multi-walled carbon nanotubes.

6. The method of claim 4, wherein the conductive membrane is prepared by filtering a solution of the conductive carbon nanotubes through a polymeric membrane.

7. The method of claim 4, wherein the conductive membrane is prepared by preparing a third solution comprising a polymer and the conductive carbon nanotubes; and casting the third solution to provide the conductive membrane.

8. The method of claim 1, wherein the first solution comprises at least one electrochemically active compound.

9. The method of claim 8, wherein the electrochemically active compound comprises an aryl diazonium salt, wherein the aryl group is substituted, either directly or through a linking group, with at least one functional group.

10. The method of claim 9, wherein each electrochemically active compound is of the formula, wherein R comprises the functional group and A⁻ is an electrochemically acceptable anion.

11. The method of claim 10, wherein each electrochemically active compound is of the formula, 12. The method of claim 1, wherein each electrochemically active compound comprises an electropolymerizable monomer.

13. The method of claim 12, wherein each monomer is a (meth)acrylate or a styrene.

14. The method of claim 1, wherein the electrodeposition is an electroreduction.

15. The method of claim 2, wherein the second solution comprises at least one surface-modifying compound.

16. The method of claim 15, wherein the surface-modifying compound comprises at least one functional group and at least one chemical group capable of reacting with or coordinating to the first metal layer surface.

17. The method of claim 1, further comprising contacting the functionalized conductive membrane with metal nanoparticles, wherein at least a portion of the functional groups present are capable of bonding to or coordinating to the metal nanoparticles to provide a nanoparticle-coated functionalized membrane.

18. The method of claim 17, wherein the metal nanoparticles comprise Au, Ag, or Pt.

19. The method of claim 1, wherein the one or more conditions comprise electrochemical oxidation.

20. The method of claim 1, wherein the one or more conditions comprise chemical oxidation.

21. The method of claim 1, further comprising:
   contacting the functionalized conductive membrane with metal nanoparticles,
      wherein
      the at least one electrochemically active compound or at least one surface-modifying compound comprise functional groups;

at least a portion of the functional groups are capable of bonding to or coordinating to the metal nanoparticles; and the functionalized conductive membrane is a porous membrane.

22. A method for changing the pore size of a porous membrane, the method comprising:

forming a metallized porous membrane by electrochemically depositing a first metal layer on a surface of a porous membrane by contacting the porous membrane to a first solution having metal therein;

contacting the metallized porous membrane with a second solution including at least one first electrochemically active compound or at least one first surface-modifying compound, each including functional groups;

wherein the first metal layer is removable from the metallized porous membrane and at least a portion of the functional groups comprise nanoparticles;

forming a functionalized membrane configured as a filtration membrane by functionalizing the metallized porous membrane by depositing the at least one first electrochemically active compound or at least one first surface-modifying compound on a surface of the metallized porous membrane effective to form a first average pore size therein;

removing the first metal layer from the functionalized porous membrane by subjecting the functionalized porous membrane to one or more conditions suitable for removing the first metal layer from the functionalized porous membrane;

electrochemically depositing a second metal layer on the surface of the porous membrane having the first metal layer removed therefrom; and functionalizing the re-metallized porous membrane by contacting the re-metallized porous membrane with another solution comprising at least one second electrochemically active compound or at least one second surface-modifying compound that is different from the at least one first electrochemically active compound or at least one first surface-modifying compound respectively, effective to form a functionalized and re-metallized filtration membrane having a different average pore size than the first average pore size.

23. The method of claim 1, further comprising filtering a first analyte with the functionalized conductive membrane before removing the first metal layer from the functionalized conductive membrane.

24. The method of claim 23, further comprising filtering a second analyte with the functionalized and re-metallized conductive after functionalizing the re-metallized conductive membrane and the second analyte is different than the first analyte.

* * * * *